(12) United States Patent
Vollers

(10) Patent No.: US 6,729,069 B1
(45) Date of Patent: May 4, 2004

(54) TAPERED WALL CONTAINER WITH REPLACEABLE SLEEVE

(76) Inventor: Gary L. Vollers, 11471 Tampa Ave., #149, Northridge, CA (US) 91326

( * ) Notice: Subject to any disclaimer, the term of this patent is extended or adjusted under 35 U.S.C. 154(b) by 0 days.

(21) Appl. No.: 10/356,748

(22) Filed: Feb. 3, 2003

(51) Int. Cl.⁷ ................................................. A01G 9/02
(52) U.S. Cl. ..................................................... 47/66.6
(58) Field of Search ............................... 47/66.6, 65.7, 47/72; 220/23.87; 206/423

(56) References Cited

U.S. PATENT DOCUMENTS

| 265,836 A | * 10/1882 | Lindner ................... 40/124.06 |
|---|---|---|
| 1,421,628 A | * 7/1922 | Watkins ....................... 220/9.4 |
| 1,520,647 A | 12/1924 | Hennegan |
| 1,610,652 A | * 12/1926 | Bouchard ....................... 47/72 |
| 1,829,915 A | 11/1931 | Wasser |
| 3,787,993 A | 1/1974 | Lyon |
| 4,713,900 A | 12/1987 | Calloway, Jr. et al. |
| 4,827,643 A | 5/1989 | Hearst et al. |
| 5,077,937 A | 1/1992 | Weder et al. |
| 5,293,715 A | 3/1994 | Kaz |
| 5,493,810 A | 2/1996 | Weder et al. |
| 5,572,784 A | * 11/1996 | Weder et al. .................. 29/451 |
| 5,577,345 A | * 11/1996 | Weder et al. ................... 47/72 |
| 5,896,698 A | 4/1999 | Nurse |
| 6,061,955 A | * 5/2000 | Domstein ................... 47/41.01 |
| 6,076,940 A | * 6/2000 | Sanford, Jr. ................. 362/253 |
| 6,105,311 A | * 8/2000 | Weder ........................... 47/72 |
| 6,438,898 B1 | * 8/2002 | Weder ........................... 47/72 |
| 6,505,425 B1 | * 1/2003 | Gilbert ......................... 40/306 |

FOREIGN PATENT DOCUMENTS

| GB | 2128083 A | * 4/1984 | ............ A47G/7/08 |
|---|---|---|---|
| GB | 2213693 A | * 8/1989 | ............ A01G/9/02 |

* cited by examiner

Primary Examiner—Peter M. Poon
Assistant Examiner—Bethany L. Griles
(74) Attorney, Agent, or Firm—William W. Haefliger

(57) ABSTRACT

A method of providing identification on a container having a tapered outer surface, that includes providing an identifying sleeve having the form of a truncated cone; assembling the sleeve onto the container to accommodate to a tapered surface; and mechanically retaining the sleeve on the container, to be optionally easily released, if desired.

9 Claims, 3 Drawing Sheets

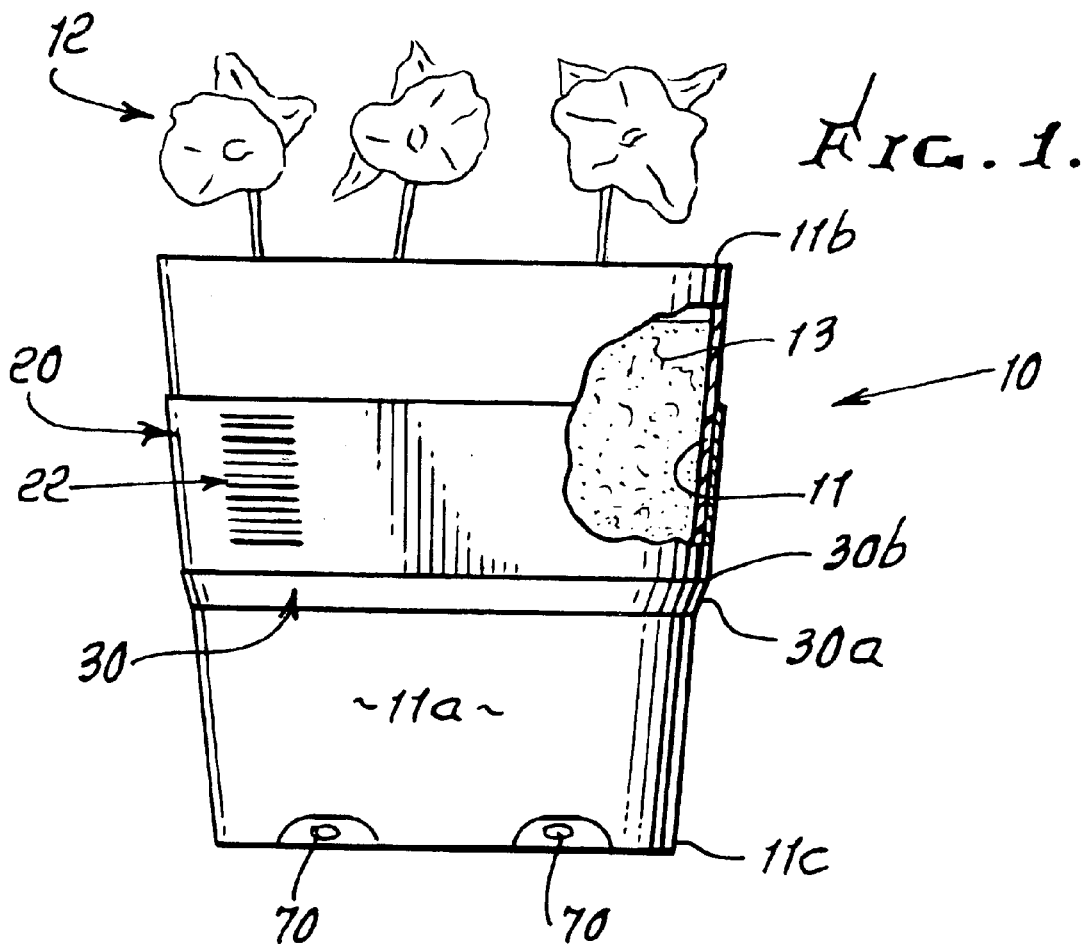
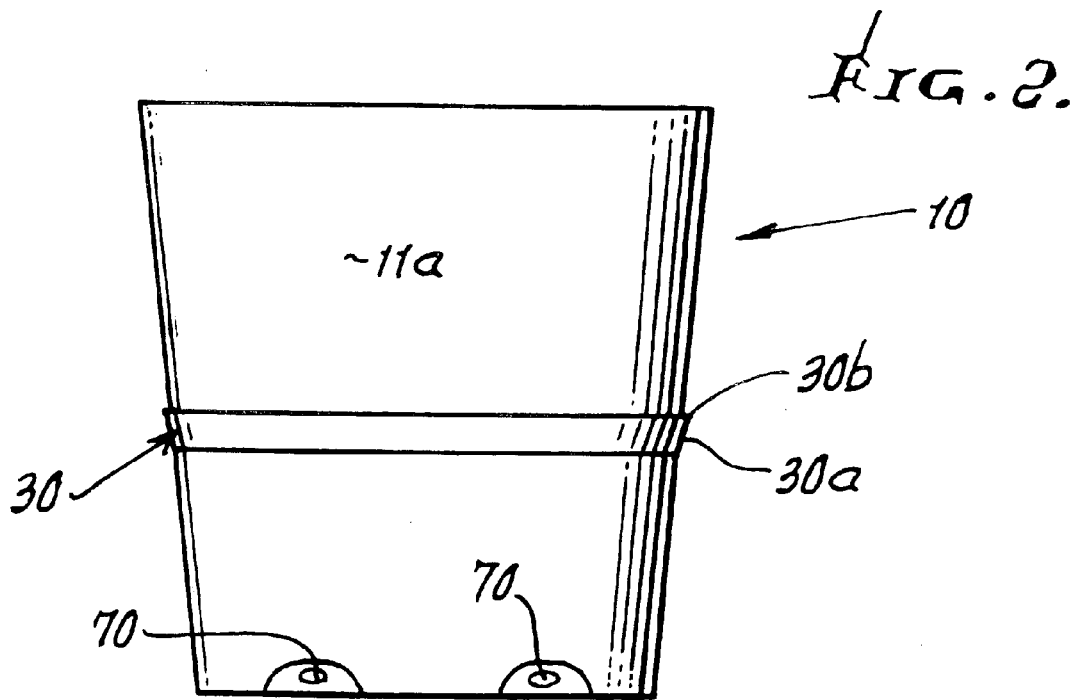

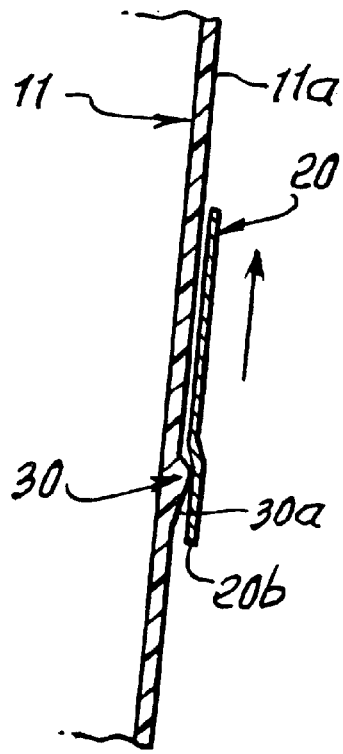
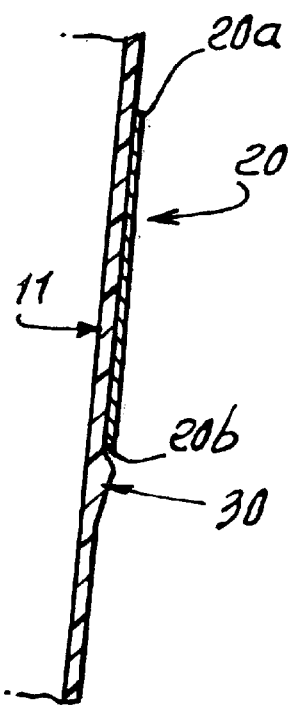
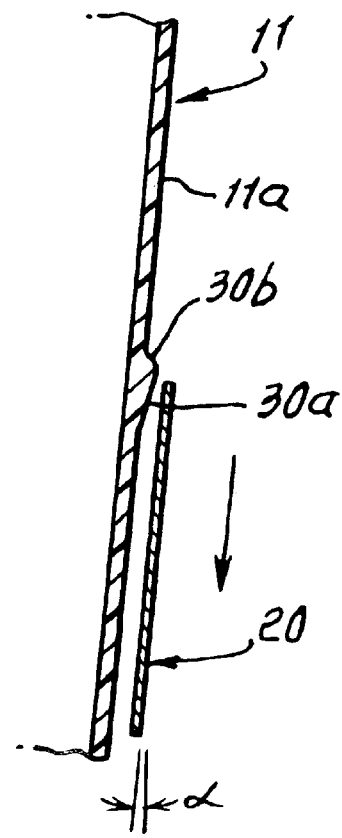
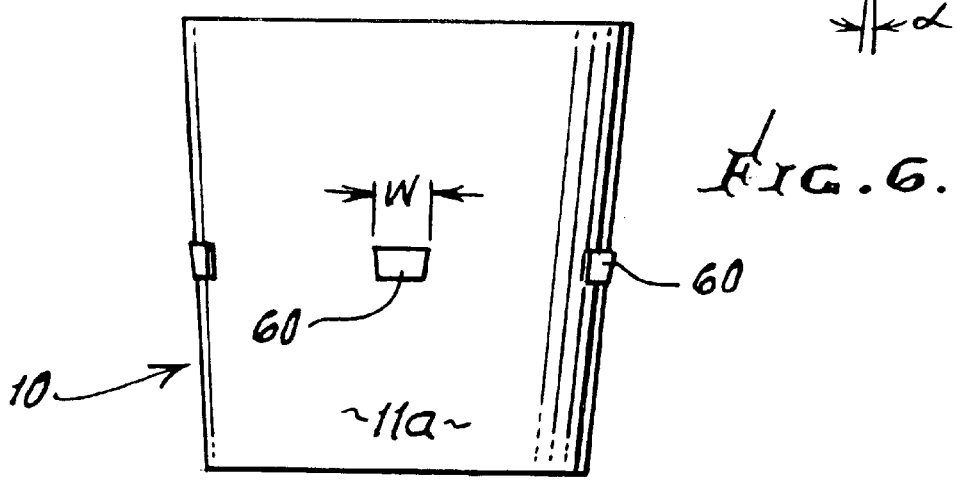

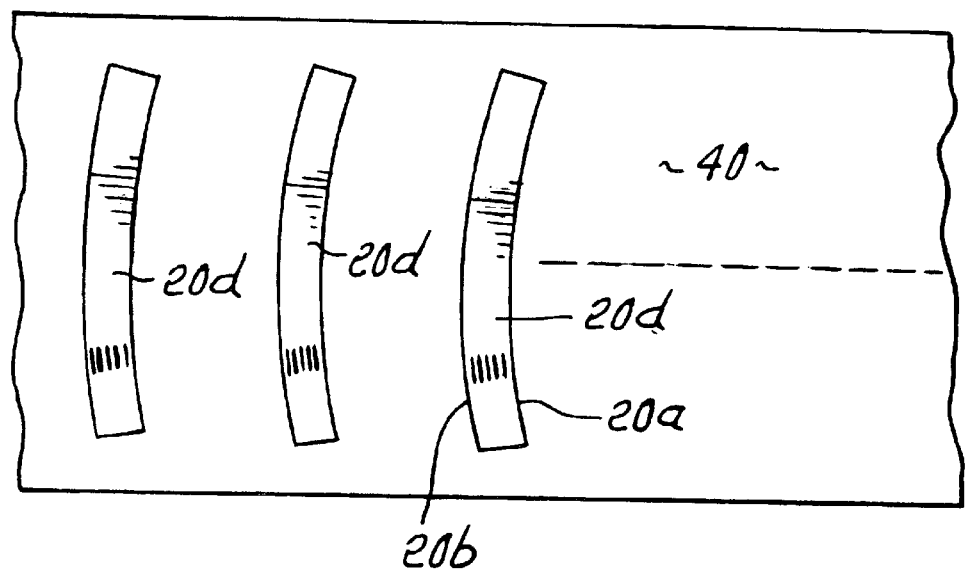
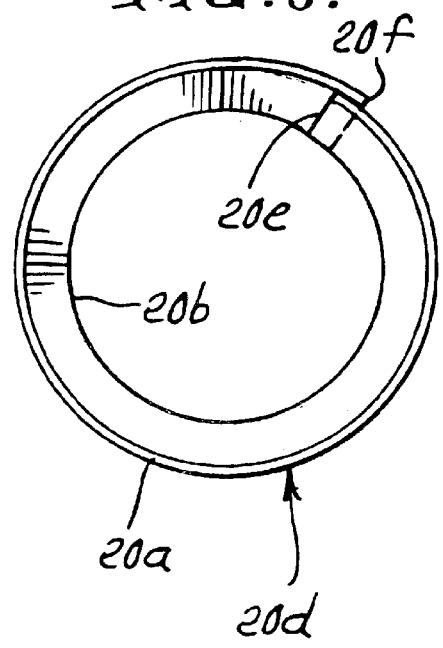
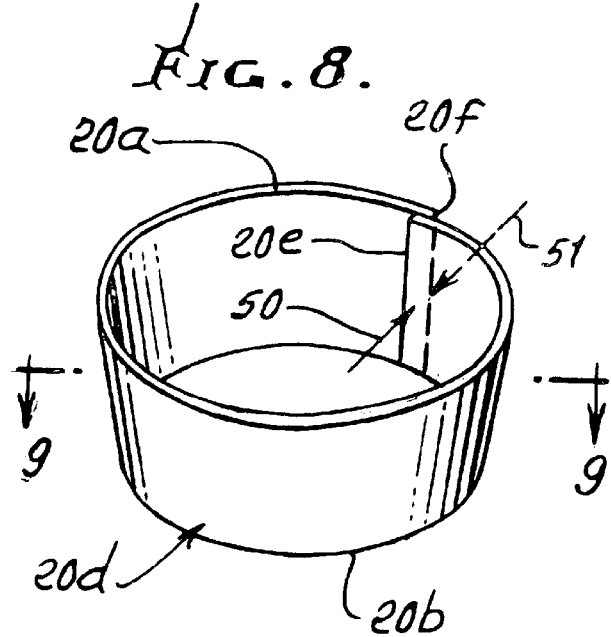

TAPERED WALL CONTAINER WITH REPLACEABLE SLEEVE

BACKGROUND OF THE INVENTION

This invention relates generally to identification of flower containers or pots, as for example are used at nurseries. More particularly, it concerns changes in identification of such pots, as by easy removal of identifying sleeves assembled to such pots.

Very large numbers of low-cost flower pots are produced for use as by nurseries, and it is necessary or desirable to quickly identify them or their buyer companies, i.e. nurseries. Identifying labels have been employed by producers, however, they are typically permanently attached to pot walls, as by bonding or other means. Such pots are filled with flowers for delivery to nurseries, and the attached labels may also identify such flowers. A serious problem arises in the event that buyers such as nurseries elect not to take delivery of such pots previously ordered from producers since there are typically many hundreds of such permanently labeled pots involved in an order. The producer is then faced with the problem of re-labeling the pots to sell to another nursery, and requires removal of permanently bonded labels from hundreds of pots.

There is need for method and means to overcome this problem.

SUMMARY OF THE INVENTION

It is a major object of the invention to provide a solution to the above described problem of flower pot re-labeling, such pots typically having downwardly tapering outer surfaces.

In accordance with the invention the method includes:
a) providing an identifying sleeve having the form of a truncated cone,
b) assembling the sleeve onto the pot or container, to accommodate to said tapered surface,
c) and mechanically retaining the sleeve on the container, to be optionally easily released, if desired.

It is another object to print identifying indicia on the sleeve, so that when the sleeve is removed from the pot, another sleeve bearing other indicia can quickly and easily be assembled onto the pot and mechanically retained in place.

A further object includes providing a blocking part or parts on the container, i.e. pot, to project relative to the pot surface, so that the sleeve can be mechanically blocked by,such part or parts against inadvertent removal from the container. That part may be configured to project outwardly relative to the pot surface, and the sleeve is caused to pass by the part or parts during assembly. The blocking part may be provided with a camming surface facing toward the sleeve as the sleeve is assembled endwise upwardly onto the downwardly tapered pot, to assist such assembly.

The container may be a thin walled plastic container or pot configured to receive fill that includes root structure of vegetation.

Yet another object is to provide a sleeve retainer on a local portion of the pot wall, and without preventing bending of the wall into generally conical shape. The sleeve is typically provided by forming a flexible blank having arcuate upper and lower edges, forming that blank into truncated cone wall shape, and fixing the sleeve in said wall shape, to slide over the retainer, during assembly. The retainer upper ledge may be angled to assist sleeve removal form the container.

These and other objects and advantages of the invention, as well as the details of an illustrative embodiment, will be more fully understood from the following specification and drawings, in which:

DRAWING DESCRIPTION

FIG. 1 is an elevational view of a flower pot, carrying an identification sleeve, retained in position but not bonded to pot side wall;

FIG. 2 is a view of the flower pot of FIG. 1, but without the sleeve assembled to the side wall;

FIG. 3 is an enlarged sectional elevation, showing upward application of the sleeve onto the pot side wall;

FIG. 4 is like FIG. 3, but showing positive mechanical retention of the sleeve to the side wall, the sleeve blocked against downward removal;

FIG. 5 is a view like FIG. 4, but showing forcible downward removal of the sleeve from the pot;

FIG. 6 is a view like FIG. 2, but showing local ridges on the pot side wall, for retaining a sleeve;

FIG. 7 is a plan view showing formation of sleeve blanks arcuate in shape;

FIG. 8 is a perspective view of a sleeve, after formation into truncated conical shape; and FIG. 9 is a top plan view taken on lines 9—9 of FIG. 8.

DETAILED DESCRIPTION

FIGS. 1 and 2 show a thin-walled plastic flower pot 10, having a downwardly tapered outer surface 11$a$ on wall 11. The pot or container may be molded, or otherwise formed. That surface has truncated conical shape, and wall 11 has upper and lower generally circular edges 11$b$ and 11$c$. Numeral 12 indicates flowers or other vegetation growing upwardly from fill 13 in the pot interior. Such fill typically includes soil and water. The pot typically has a perforated bottom wall, allowing drainage. Wall thickness is typically between 0.015 and 0.030 inches, and usable plastic material may be any one of the following: polypropylene, polyethylene, and PET.

An identification sleeve 20 is provided for assembly onto the pot, and it typically has the form of truncated cone, with taper angularity $\alpha$ (see FIG. 5) the same as that of the pot wall, so as to fit the wall when upwardly assembled to it, as in 4. FIG. 3 shows the sleeve being moved upwardly, toward FIG. 4 fit position. Sleeve 20 is also typically made of thin plastic material, its thickness being less than that of the wall. Upper and lower edges of the sleeve are indicated at 20$a$ and 20$b$. The sleeve typically bears surface indicia, as represented by bar code 22, or a graphical emblem, picture, or colors may be on the sleeve. If the sleeve were to be bonded to the wall 11, a problem would exist in the event sleeve removal, as from thousands of pots, were required.

In accordance with an important aspect of the invention, a way is provided to mechanically retain the sleeve on the pot wall, while at the same time enabling its easy and quick removal, if needed. For this purpose, a sleeve retaining blocking part or parts is or are provided on the pot wall 11, to project relative to surface 11$a$ for camming the sleeve in order to become blocked by said part or parts against inadvertent removal from the container. In this regard, the blocking part or parts is or are configured to project outwardly relative to the sleeve surface, and the sleeve is caused to pass by that part or parts, with interference, during assembly. See for example the retainer ridge 30 on wall 11 and projecting outwardly at the bottom edge 20b of the sleeve in FIG. 4, to mechanically support the sleeve. That ridge is shown as extending at least part way about the wall 11, and as having an upwardly and outwardly sloped cam surface 30a, just below the ridge upper surface 30b that supports the sleeve lower edge. Cam surface 30a serves to resiliently expand the sleeve, as the sleeve is assembled upwardly, as in FIG. 3 over the ridge, to ultimately fit the container wall as seen in FIG. 4. Also, the ridge may have a downwardly rounded or sloped upper surface 30b, to ease the sleeve over the ridge during downward removal off the container, as seen in FIG. 5. Since the sleeve is not bonded to wall 11a, it may be cut between edges 20a and 20b to enable quick removal off the container.

FIG. 7 shows a sheet 40 of material, as for example plastic, from which sleeve blanks 20d may be cut, as shown. Such blanks are curved as at edges 20a and 20b, so that the blanks can be formed as in FIG. 8 into truncated cone shape. Endwise edge portions 20e and 20f of the sleeve are overlapped as shown, during forming, and sealed as by heat sealing of thermoplastic material. See arrows 50 and 51 indicating such heat sealing.

FIG. 6 shows a modification, wherein one or more limited width blocking parts 60 are provided on the wall 11, to support a sleeve. The use of such parts of limited width "W", further facilitates assembly of the sleeve onto the wall 11, as well as sleeve downward removal, since the sleeve need expand outwardly only locally, over 60. Width "W" is preferably less than ¼ the circumference of the wall at the part 60 location.

FIG. 1 also shows water drainage holes 70 elevated above the bottom level of the container.

I claim:

1. The method of providing identification on a container having a tapered outer surface, that includes
    a) providing an identifying sleeve having the form of a truncated cone,
    b) sliding the sleeve onto the container, and over said tapered surface,
    c) and mechanically retaining the sleeve on the container, to be optionally easily released, if desired,
    d) providing at least one blocking part on said container to project outwardly relative to said surface, and causing the sleeve to become blocked by said part or parts against inadvertent removal from the container in the direction of container taper,
    e) said at least one part defining a side surface angled to interfere with but ease the sleeve over said surface to endwise engage an end surface of said part and to become blocked as defined,
    f) said end surface angled to ease the sleeve over said part and past said side surface, for sleeve removal,
    g) said side surface angularity being less than said end surface angularity, in the direction of said sliding.

2. The method of claim 1 including providing indicia on the sleeve.

3. The method of claim 2 including printing said indicia on the sleeve prior to sleeve assembly onto the container.

4. The method of claim 1 including optionally removing the sleeve by cutting the sleeve to free it from the container.

5. The method of claim 1 wherein the container is a thin walled plastic container configured to receive fill that includes root structure of vegetation.

6. The method of claim 2 wherein the container is a thin walled plastic container configured to receive fill that includes root structure of vegetation, and including mechanically removing the sleeve if said indicia is not identifying for a company purchasing the container.

7. The method of claim 6 wherein the sleeve remains unbonded to the container prior to said removing of the sleeve from the container.

8. The method of claim 1 wherein the sleeve is provided by forming a flexible blank having arcuate upper and lower edges, forming said blank into truncated cone wall shape, and fixing the sleeve in said wall shape.

9. The method of claim 8 wherein the sleeve consists of plastic material selected from the following group:
    i) polyethylene
    ii) polypropylene
    ii) thermoplastic material
    iv) PET.

* * * * *